(12) United States Patent
Nishigaki

(10) Patent No.: US 8,406,506 B2
(45) Date of Patent: Mar. 26, 2013

(54) FAST SUB-PIXEL OPTICAL FLOW ESTIMATION

(75) Inventor: Morimichi Nishigaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 12/782,045

(22) Filed: May 18, 2010

(65) Prior Publication Data

US 2011/0286635 A1  Nov. 24, 2011

(51) Int. Cl.
*G06K 9/00* (2006.01)
(52) U.S. Cl. ......... 382/153; 382/243; 382/103; 382/107
(58) Field of Classification Search .................. 382/103, 382/107, 153
See application file for complete search history.

(56) References Cited

U.S. PATENT DOCUMENTS

| | | | |
|---|---|---|---|
| 7,305,034 B2 | 12/2007 | Srinivasan | |
| 7,408,990 B2 | 8/2008 | Lin et al. | |
| 2002/0114394 A1* | 8/2002 | Ma | 375/240.16 |
| 2006/0165276 A1* | 7/2006 | Hong et al. | 382/153 |
| 2006/0269155 A1* | 11/2006 | Tener et al. | 382/243 |
| 2007/0171987 A1* | 7/2007 | Trimeche | 375/240.27 |
| 2008/0018788 A1 | 1/2008 | Zhou et al. | |

FOREIGN PATENT DOCUMENTS

WO  WO 00/33253 A1  6/2000

OTHER PUBLICATIONS

Felsberg, M., "Optical Flow Estimation from Monogenic Phase," Linkoping University, Computer Vision Laboratory, SE-58183, Linkoping, Sweden, 13 pages.
Little, J. et al., "Analysis of Differential and Matching Methods for Optical Flow," MIT Artificial Intelligence Laboratory, A.I. Memo No. 1066, Aug. 1988, 27 pages.
Quenot, G.M. et al., "Particle Image Velocimetry with Optical Flow," Experiments in Fluids, 1998, vol. 25, pp. 177-189.
Song, K. et al., "Fast Optical Flow Estimation and Its Application to Real-time Obstacle Avoidance," Proceedings of the 2001 IEEE International Conference on Robotics & Automation, May 21-26, 2001, pp. 2891-2896, Seoul, Korea.

* cited by examiner

*Primary Examiner* — Hadi Akhavannik
(74) *Attorney, Agent, or Firm* — Fenwick & West LLP; Mark E. Duell

(57) ABSTRACT

A system and method are disclosed for fast sub-pixel optical flow estimation in a two-dimensional or a three-dimensional space. The system includes a pixel-level optical flow estimation module, a matching score map module, and a sub-pixel optical flow estimation module. The pixel-level optical flow estimation module is configured to estimate pixel-level optical flow for each pixel of an input image using a reference image. The matching score map module is configured to generate a matching score map for each pixel being estimated based on pixel-level optical flow estimation. The sub-pixel optical flow estimation module is configured to select the best pixel-level optical flow from multiple pixel-level optical flow candidates, and use the selected pixel-level optical flow, its four neighboring optical flow vectors and matching scores associated with the pixel-level optical flows to estimate the sub-pixel optical flow for the pixel of the input image.

19 Claims, 8 Drawing Sheets

Image at time t    310 image at time t+1    320

FAST SUB-PIXEL OPTICAL FLOW ESTIMATION

FIELD OF THE INVENTION

The present invention relates generally to estimating optical flow of an image, and in particular to estimating sub-pixel optical flow based on pixel-level optical flow estimation.

BACKGROUND OF THE INVENTION

An optical flow is the pattern of apparent motion of objects, surfaces, and edges in a visual scene caused by the relative motion between an observer (e.g., an eye of a camera) and the scene. Optical flow estimation has been an important problem in computer vision research such as motion detection, object segmentation, and disparity measurement in a two-dimensional (2D) or three-dimensional (3D) environment. Generally, pixel-level optical flow estimation is to calculate the motion between two subsequent images which are taken at times t and t+$\Delta$t every pixel position, where $\Delta$t is the time difference between the two images. Analysis of subsequent images searching for local displacements of pixels in the images allows quantitative measurement of the optical flow of the pixels. Sub-pixel level optical flow estimation method is to find sub-pixel displacement of pixels in the images.

One conventional sub-pixel optical flow estimation method is to compute pixel-level optical flow of an input image using a window-based matching algorithm. A matching score for each pixel is computed only at pixel-level. To find the sub-pixel optical flow, one existing method is to compute the matching score at an interpolated image of the input image. The problem with this method is computationally expensive due to the complex image interpolation.

Another conventional way to compute sub-pixel optical flow is to fit a parametric function, such as a spline or quadratic function, to pixel-level matching scores of an input image, and to find the maximum value of the function. The maximum value of the parametric function allows the method to compute the sub-pixel optical flow. The problem with this method is computationally expensive due to the complex computation using the parametric function.

DETAILED DESCRIPTION OF THE INVENTION

Figure 1:
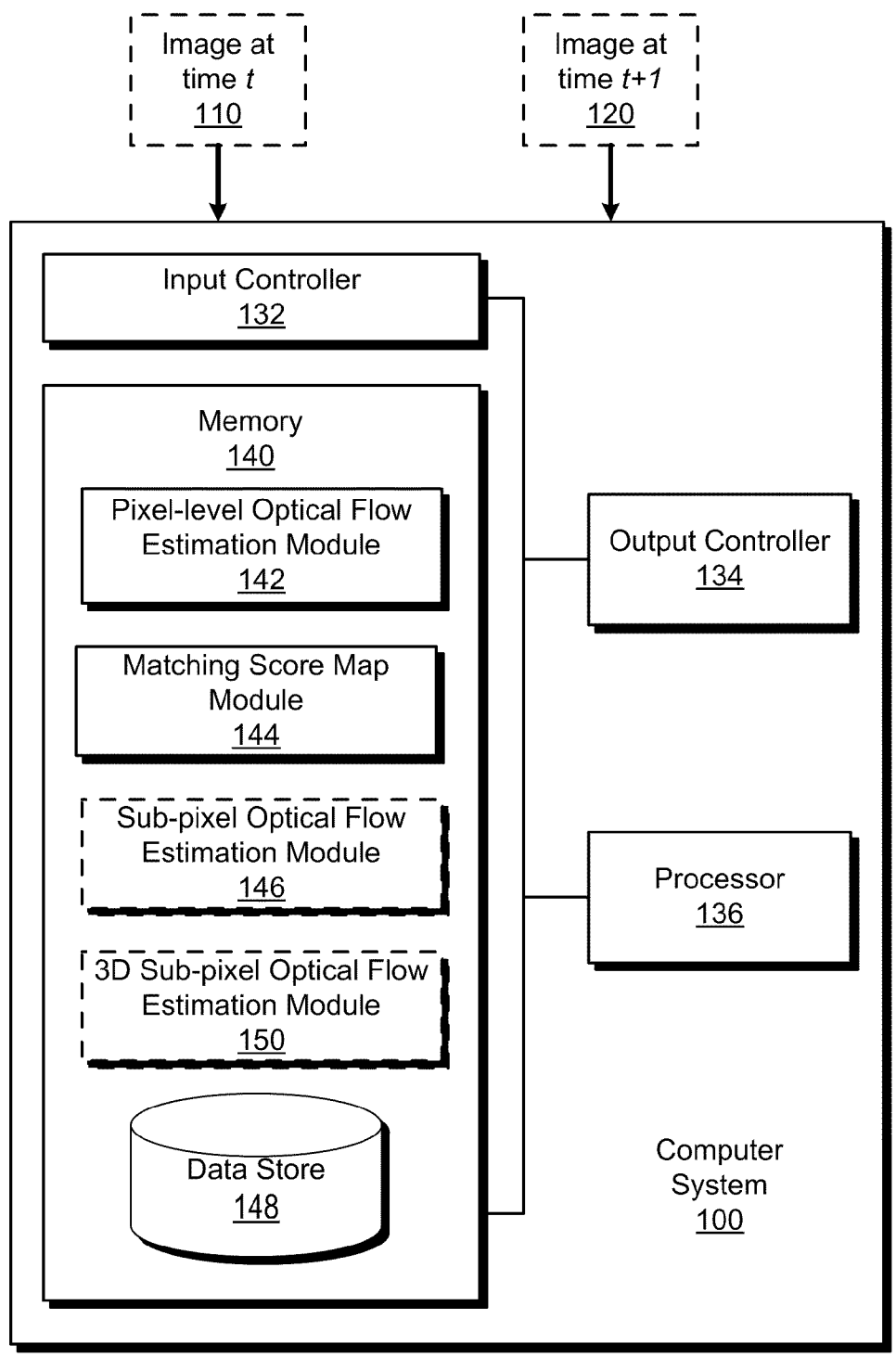
FIG. 1 illustrates a computer system for sub-pixel optical flow estimation according to one embodiment of the invention.

An embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Embodiments of the invention provide fast and robust subpixel optical flows for pixels of an input image by approximating the sub-pixel optical flows in a two-dimensional space and a three-dimensional (3D) space. A sub-pixel optical flow estimation system exploits pixel-level optical flows and corresponding matching scores to directly compute sub-pixel optical flows. By using pixel-level optical flows and corresponding matching scores, the sub-pixel optical flow estimation system avoids complex and computationally expensive image interpolation and parametric functions to compute sub-pixel optical flows. Using a selected pixel-level optical flow and its four neighboring optical flows by the sub-pixel optical flow estimation system provides a suitable sub-pixel optical flow estimation solution in real-time. The disclosed sub-pixel optical flow estimation system has a wide range application to real world problems, such as applications in robotics and automotive systems.

One embodiment of a disclosed system (and method) includes estimating sub-pixel optical flow for a pixel of an input image using pixel-level optical flow and its neighboring optical flow vectors. The system includes a pixel-level optical flow estimation module, a matching score map module, and a sub-pixel optical flow estimation module. The pixel-level optical flow estimation module is configured to estimate pixel-level optical flow for each pixel of an input image using a reference image. The matching score map module is configured to generate a matching score map for each pixel being estimated based on pixel-level optical flow estimation. The sub-pixel optical flow estimation module is configured to select the best pixel-level optical flow from multiple pixel-level optical flow candidates for a pixel of the input image. The sub-pixel optical flow estimation module is further configured to use the selected pixel-level optical flow and its four neighboring optical flow vectors and matching scores associated with the pixel-level optical flows to estimate the sub-pixel optical flow for the pixel of the input image.

System Overview

FIG. 1 illustrates a computer system 100 for sub-pixel optical flow estimation according to one embodiment of the invention. The computer system 100 comprises an input controller 132, an output controller 134, a processor 136 and a memory 140. The computer system 100 is configured to receive an input image and its reference image, such as two or more successive images of a video sequence, and to estimate pixel-level optical flow of each pixel of the input image. In the embodiment illustrated in FIG. 1, an image 110 at time t and an image 120 at time t+1 are the input image and its reference image for the computer system 100. The input data for sub-pixel optical flow estimation is further described below with reference to FIG. 3.

The memory 140 stores data and/or instructions that may be executed by the processor 136. The instructions may comprise code for performing any and/or all of the techniques described herein. Memory 140 may be a DRAM device, a static random access memory (SRAM), Flash RAM (non-volatile storage), combinations of the above, or some other memory device known in the art. In one embodiment, the memory 140 comprises a pixel-level optical flow estimation module 142, a matching score map module 144, a two-dimensional sub-pixel optical flow estimation module 146 and a data store 148. In another embodiment, the memory 140 comprises the pixel-level optical flow estimation module 142, the matching score map module 144, a 3D sup-pixel optical flow estimation module 150 and the data store 148. For different embodiments, the computer system 100 can be configured to use either the two-dimensional sub-pixel optical flow estimation module 146 or the 3D sub-pixel optical flow estimation module 150 for carrying out the sub-pixel optical flow estimation process described below with reference to FIGS. 5-8. To simplify the description of one embodiment of the invention, the two-dimensional sub-pixel optical flow estimation module 146 is referred to as "sub-pixel optical flow estimation module 146" from herein and throughout the entire specification.

Figure 2:
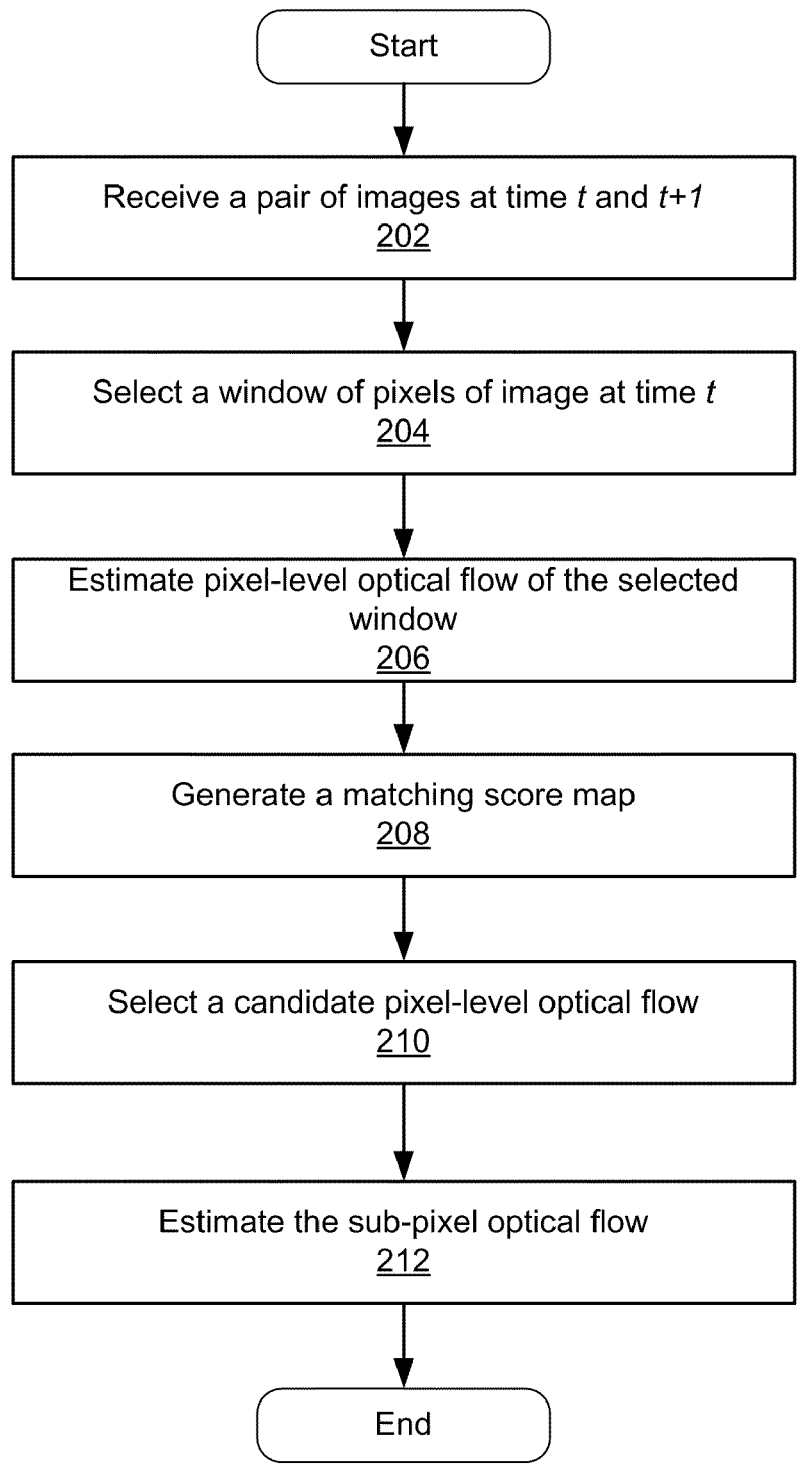
FIG. 2 is a flowchart of a sub-pixel optical flow estimation method according to one embodiment of the invention.
Figure 3:
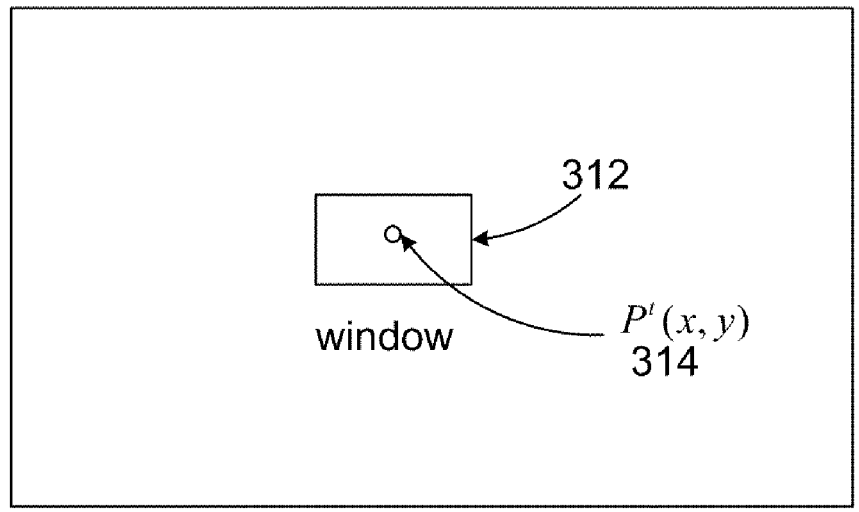
FIG. 3 is an example of window-based pixel-level optical flow estimation according to one embodiment of the invention.
Figure 3:
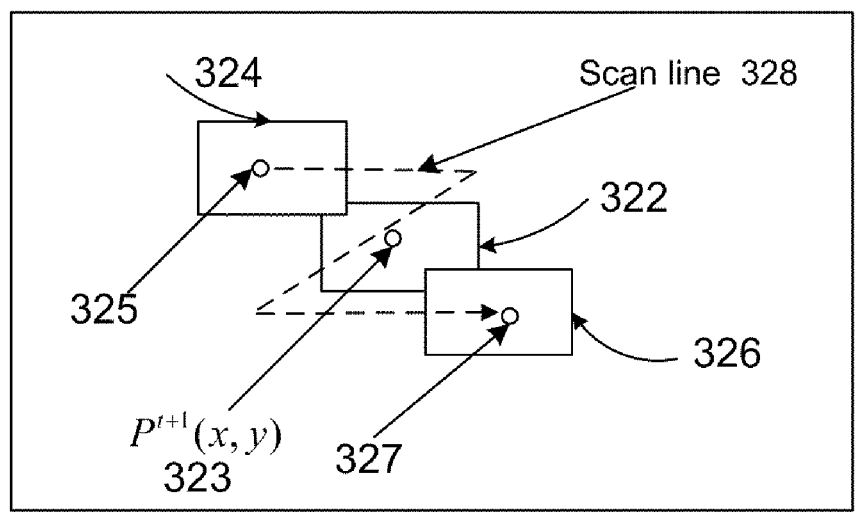

The pixel-level optical flow module 142 comprises computer executable instructions for carrying out the pixel-level optical flow estimation described with references to FIGS. 2 and 3. The matching score map module 144 comprises computer executable instructions for carrying out the matching score map generation process described below with reference to FIGS. 2 and 4. The sub-pixel optical flow estimation module 146 comprises computer executable instructions for carrying out the sub-pixel optical flow estimation process described below with reference to FIGS. 5, 6 and 7. The 3D sup-pixel optical flow estimation 150 comprises computer executable instructions for carrying out the sub-pixel optical flow estimation process described below with reference to FIG. 8. The data store 148 stores the optical flow estimation data of one or more visual input data in one embodiment of the invention.

FIG. 2 is a flowchart of a sub-pixel optical flow estimation method according to one embodiment of the invention. Initially, the computer system 100 receives 202 a pair of successive images at time t and t+1 by the pixel-level optical flow estimation module 142. The pixel-level optical flow estimation module 142 selects 204 a window of pixels from the image at time t, and for each pixel of the selected window, estimates 206 the pixel-level optical flow with respect to the image at t+1. The matching score map module 144 generates 208 a matching score map for each pixel of the image at time t, and the matching score map contains the matching scores of associated with candidate optical flow vectors of the pixel. A matching score indicates the accuracy of the pixel-level optical flow estimation. In an embodiment using the sub-pixel optical flow estimation module 146, the sub-pixel optical flow estimation module 146 selects 210 the best pixel-level optical flow of a pixel from multiple candidate optical flow vectors based on the matching scores of the candidate optical flow vectors. The sub-pixel optical flow estimation module 146 estimates 212 the sub-pixel optical flow based on the pixel-level optical flow estimation. In an embodiment using the 3D sub-pixel optical flow estimation module 150, the 3D sub-pixel optical flow estimation module 150 selects 210 the best pixel-level optical flow of a pixel from multiple candidate optical flow vectors based on the matching scores of the candidate optical flow vectors. The 3D sub-pixel optical flow estimation module 150 estimates 212 the sub-pixel optical flow based on the pixel-level optical flow estimation. The pixel-level optical flow estimation is further described below with reference to FIG. 3. The accuracy of the pixel-level optical flow estimation is illustrated below with reference to FIG. 4. The sub-pixel optical flow estimation is further described below with reference to FIGS. 5-8.

Pixel-Level Optical Flow Estimation

FIG. 3 is an example of window-based pixel-level optical flow estimation according to one embodiment of the invention. The pixel-level optical flow estimation module 142 receives a pair of successive images, image 310 at time t and image 320 at t+1. The image 310 at time t is an input image and the image 320 at t+1 is a reference image of image 310 for optical flow estimation. To estimate the optical flow of a pixel $P^t$ (x, y) of image 310, the optical flow estimation module 142 selects a window 312 centered on the pixel, $P^t$ (x, y) 314, to be estimated, where (x, y) is the horizontal and vertical coordinates of the pixel $P^t$ (x, y) in an x-y coordinate system. In one embodiment, the window 312 has a predetermined size, such as 3-pixel by 3-pixel (i.e., a 3×3 window), 5×5 or 11×11. Other embodiments may use windows of sizes different from the examples described above. To simplify the description of one embodiment of the invention, the term "optical flow" and the term "optical flow vector" are used interchangeably from herein and throughout the entire specification.

The optical flow estimation module 142 also selects a search window 322 of pixels from the image 320 at time t+1. The window 322 has the same size as the window 312 of the image 310 at time t. The window 322 is centered on the pixel 323 $P^{t+1}$ (x, y), that has the same coordinates in the image 320 as the pixel to be estimated of the image 310, $P^t$ (x, y). Pixel 323 $P^{t+1}$(x, y), is the corresponding pixel of pixel 314 $P^t$ (x, y) with the same co-location at image 320. In the embodiment illustrated in FIG. 3, (x, y) is the origin of the x-y coordinate system, i.e., (x, y)=(0,0).

To estimate the optical flow of $P^t$ (x, y) of image 310, the optical flow estimation module 142 scans around the pixel $P^{t+1}$ (x, y) of image 320 to find an optical flow vector for the pixel $P^t$ (x, y) of image 310. The scan range is equal to the range of candidate optical flows for the pixel $P^t$ (x, y) of image 310. The scan range depends on how large the possible optical flow is between the image 310 at time t and the image 320 at time t+1. In one embodiment, the scan range is set to (−20, 20) by the optical flow estimation module 142. The scan range is measured horizontally and vertically around the pixel $P^{t+1}$ (x, y) of image 320. The relative motion of each pixel within the scan range is a candidate optical flow for pixel $P^t$ (x, y) of image 310, and the optical flow estimation module 142 calculates a matching score associated with each optical flow candidate for the pixel $P^t$ (x, y) of image 310.

Taking the scan range (−20, 20) for pixel $P^t$ (x, y) of image 310 as an example, where (x, y)=(0,0), the optical flow estimation module 142 moves the search window 322 of image 320 at time t+1 from the position indicated by window 324 to the position indicated by window 326. Window 324 and window 326 have the same size as the window 322 and window 312. The center of the window 324 is at pixel 325 located at (−20, −20). The center of the window 326 is at pixel 327 located at (+20, +20). The optical flow estimation module 142 uses a zigzag scan, starting from the center 325 of the window 324 and ending at the center 327 of the window 326. The zigzag scan is represented by the scan line 328 in FIG. 3. The optical flow estimation module 142 moves the window 324 horizontally to the right, one pixel at a time, until it reaches to the scan range limit (e.g., pixel at (+20, −20)). The optical flow estimation module 142 then moves the window 324 vertically towards the window 326, one pixel at a time. In one embodiment, the optical flow estimation module 142 continues moving the window 324 horizontally and vertically until it completely overlaps with the window 326. At each pixel position within the scan range, the optical flow estimation module 142 has a new search window of pixels. For each pixel within the scan range, the optical flow estimation module 142 calculates a matching score of the pixel being scanned against its corresponding pixel of the window 312 of image 310.

The flow estimation module 142 scans the entire scan range along the scan line 328 in image 320 for pixel $P^t$ (x, y) of image 310 and generates a matching score for each pixel being scanned. In one embodiment, the matching score of an optical flow candidate is the sum of absolute difference between the pixel values of the pixels of the window 312 and the pixel values of the pixels of a search window (e.g., window 324) along the scanning line 328 at image 320. In alternate embodiments, other scoring methods, such as sum of squared differences and normalized cross-correlation, can be used. Similar to sum of absolute differences scoring method described above, the scoring method of sum of squared differences represents quality (e.g., badness) of the matching between the pixels of window 312 at image 310 and the pixels of a search window being scanned at image 320. The scoring method of normalized cross-correlation can be used to indicate matching quality (e.g., goodness) between the pixels of the searching windows.

For a candidate optical flow vector (u, v), which measures the displacement of the pixel $P^t$ (x, y) at time t and time t+1 in the scan range, its matching score is described in the following equation:

$$\sum_{r=-h}^{+h} \sum_{c=-w}^{+w} |I^t(x+c, y+r) - I^{t+1}(x+u+c, y+v+r)|, \quad (1)$$

where (x, y) is the location of the pixel of $P^t$ (x, y) of image 310, and $I^t$ (x, y) is the pixel value (also called "intensity" or "brightness" of the pixel for a gray-scale image) of pixel $P^t$ (x, y) of image 310. Similarly, $I^{t+1}$ (x+u, y+v) is the corresponding pixel value of the pixel $P^{t+1}$ (x, y) at image 320 with a pixel-level optical flow (movement) measured by the optical flow vector (u, v). $I^t$ (x+c, y+r) is the pixel value of a pixel located at (x+c, y+r) in the window 312 of image 310. $I^{t+1}$ (x+u+c, y+v+r) is the pixel value of a pixel located at (x+u+c, y+v+r) in the search window at image 320. The window size of the window 312 and window 322 is (2w+1)*(2h+1). For a 3×3 window, w=1, h=1, and for a 11×11 window, w=5, h=5.

Figure 4:
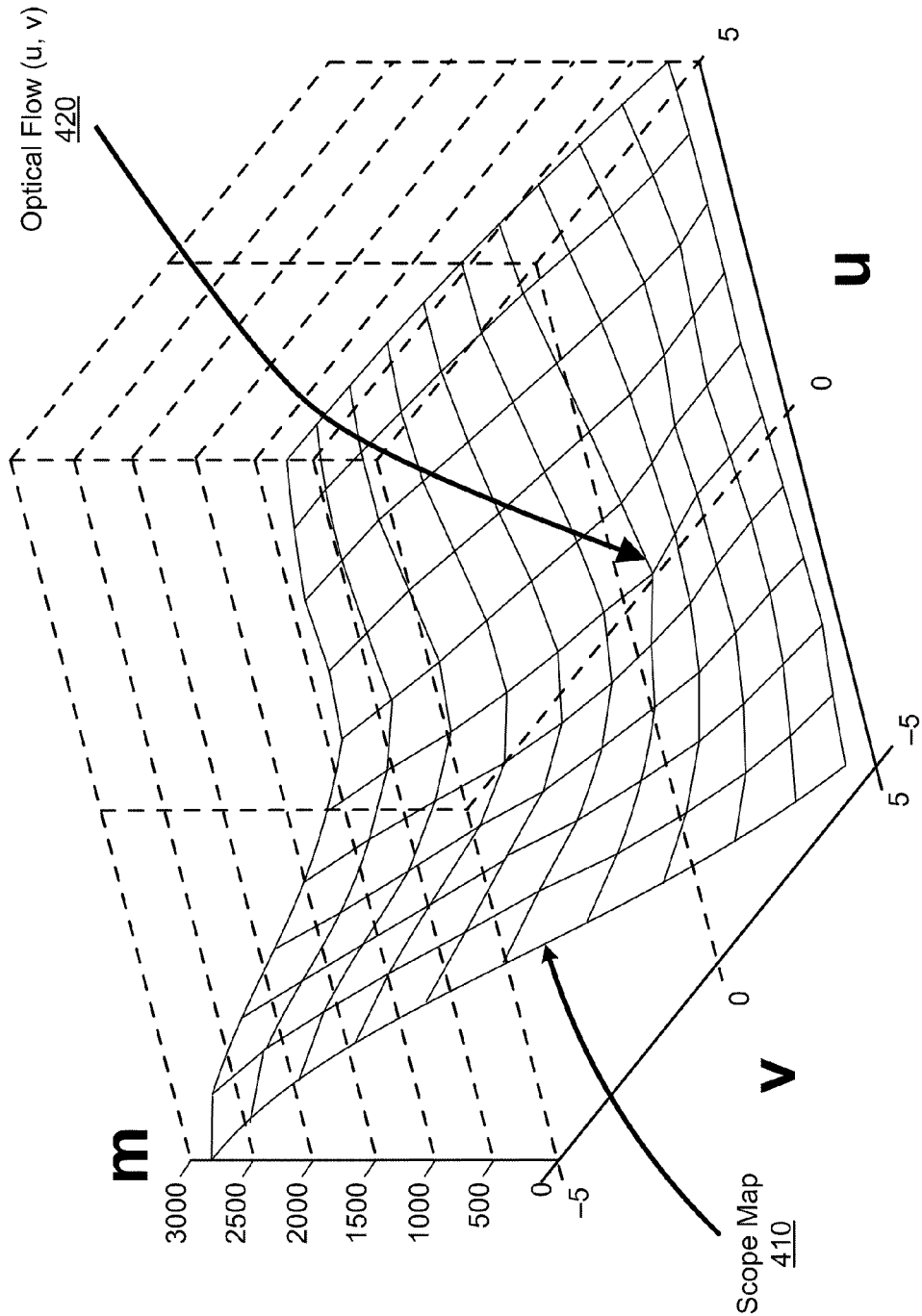
FIG. 4 is an example of a matching score map based on pixel-level optical flow estimation result according to one embodiment of the invention.

For an optical flow candidate of a pixel of image 310 at time t, its matching score based on the sum absolute difference described in equation (1) above represents the quality (e.g., badness) of the matching between the pixels of window 312 at image 310 and the pixels of a search window being scanned at image 320. The matching score map module 144 generates a matching score map for each pixel of image 310 based on the matching scores of the candidate optical flow vectors. FIG. 4 is an example of a matching score map based on the pixel-level optical flow estimation result according one embodiment of the invention. As illustrated in FIG. 4, a matching score map 410 is shown in a 3D coordinate system, (u, v, m), where (u, v) is the pixel-level candidate optical flow vector and m is the matching score of (u, v). The matching score m is represented by the values on the vertical axis of the 3D coordinate system. A higher matching score of a candidate optical flow indicates a worse matching and therefore it is less likely that the optical flow will be selected as the final pixel-level optical flow vector for pixel a $P^t$ (x, y) of image 310. As illustrated in FIG. 4, the best pixel-level optical vector has the minimum matching score in the score map 410, and is located at the lowest point 420 on the score map 410.

Sub-Pixel Level Optical Flow Estimation

For a pixel $P^t$ (x, y) of image 310, the sub-pixel optical flow estimation module 146 evaluates multiple pixel-level optical flow candidates associated with the pixel $P^t$ (x, y), and selects the best one as the pixel-level optical flow vector based on the matching scores of the optical flow candidates. The selected pixel-level optical flow vector is assigned to pixel $P^t$ (x, y) of image 310 as its pixel-level optical flow vector. The selected optical flow vector represents the best pixel-level optical flow vector for a pixel $P^t$ (x, y) of image 310 among all the candidate optical flow vectors associated with the pixel $P^t$ (x, y). The sub-pixel optical flow estimation module 146 further evaluates the selected pixel-level optical flow vector and its 4 neighboring pixel-level optical flow vectors. Based on the matching scores of the four neighboring optical flow vectors, the sub-pixel optical flow estimation module 146 determines the sub-pixel optical flow vector for the pixel $P^t$ (x, y) of image 310.

Figure 5:
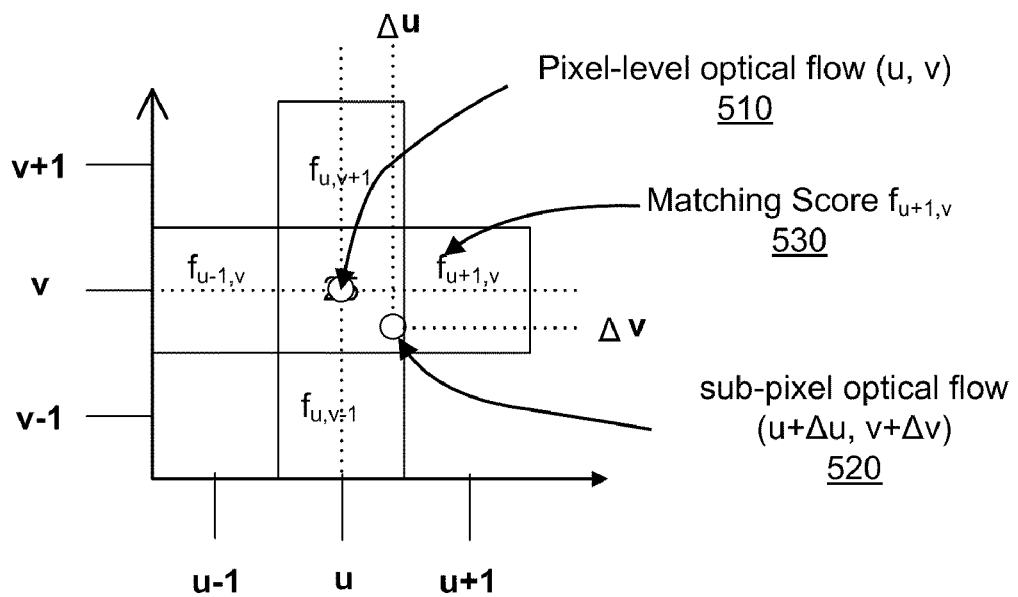
FIG. 5 is an illustration of a candidate pixel-level optical flow and its neighboring optical flow vectors according to one embodiment of the invention.

Referring now to FIG. 5, FIG. 5 is an illustration of a selected pixel-level optical flow vector (u, v) 510 of a pixel $P^t$ (x, y) of image 310 and its neighboring optical flow vectors according to one embodiment of the invention. The pixel-level optical flow vector (u, v) 510 is selected by the estimation module 146 among all the pixel-level optical flow candidates associated with the pixel $P^t$ (x, y). The optical flow vector (u, v) 510 has four neighboring optical flow vectors, (u−1, v), (u+1, v), (u, v+1), and (u, v−1). The optical flow vector (u, v) and its four neighboring optical flow vectors are described with a reference to a u-v coordinate system, where u represents the horizontal displacement of the optical flow vector (u, v), and v represents the vertical displacement of the optical flow vector (u, v). Each of the pixel-level optical flow vector (u, v) and its four neighboring optical flow vectors has a matching score associated with it. For example, the matching score for the optical flow vector (u+1, v) is $f_{u+1,v}$ 530. Similarly, the matching scores for the optical flow vectors (u, v), (u−1, v), (u, v+1) and (u, v−1) are $f_{u,v}$, $f_{u−1,v}$, $f_{u,v+1}$, and $f_{u,v−1}$, respectively.

In one embodiment, the matching scores $f_{u,v}$, $f_{u−1,v}$, $f_{u,v+1}$, and $f_{u,v−1}$ are calculated using equation (1) described above. For example, the matching scores for the optical vector (u, v) and its four neighboring optical vectors, (u−1, v), (u+1, v), (u, v+1), and (u, v−1) are $f_{u,v}$=50, $f_{u−1,v}$=170, $f_{u+1,v}$=115, $f_{u,v+1}$=135, and $f_{u,v−1}$=173. The estimation module 146 evaluates the five pixel-level optical vectors of a pixel $P^t$ (x, y) of image 310 and generates its sub-pixel level optical flow vector 520, (u+Δu, v+Δv), where Δu and Δv represent the movements of the optical flow vector (u, v) at sub-pixel level in horizontal and vertical directions.

To estimate the sub-pixel optical vector (u+Δu, v+Δv), the estimation module 146 calculates the horizontal and vertical movements Δu and Δv of the sub-pixel optical flow vector (u+Δu, v+Δv). In one embodiment, the estimation module 146 uses the matching scores of the selected optical flow vector (u, v) and its four neighboring optical flow vectors to calculate Δu and Δv.

It is noted that matching scores of a pixel-level optical flow vector are useful to estimate sub-pixel level optical flow because the matching scores of the neighboring optical flow vectors of a selected pixel-level optical flow vector represents the samples or observations of an underlying continuous function for sub-pixel optical flow estimation. The sub-pixel optical flow estimation module 146 analyzes the two neighboring optical flow vectors of the selected pixel-level optical flow vector at one direction. The sub-pixel level optical flow vector is located in between the selected pixel-level optical flow vector and a neighboring optical flow vector that has the lower matching score among the two neighboring optical flow vectors in the direction.

Using the samples or observations of the underlying continuous function for sub-pixel optical flow estimation allows the estimation module 146 to translate the sub-pixel optical flow estimation into a simpler problem of reconstructing the underlying function from the samples. In one embodiment, the estimation module 146 approximates the underlying continuous function by two lines with same slope containing the selected pixel-level optical flow vector and its two neighboring optical flow vectors in a coordinate system. The coordinate system is defined by matching score and horizontal/vertical optical flow shift. The movements (shifts) of the optical flow vector (u, v) at sub-pixel level in horizontal and vertical directions. Horizontal and vertical movements, Δu and Δv, can be calculated based on the underlying continuous function estimation.

For example, to calculate the horizontal shift Δu, the estimation module 146 uses two of the four neighboring optical flow vectors, (u−1,v) and (u+1,v), of the optical flow vector (u, v) at the horizontal direction. The estimation module 146 estimates the horizontal shift using the following equations:

$$\Delta u = \left\{ \frac{f_{u-1,v} - f_{u+1,v}}{2(f_{u+1,v} - f_{u,v})} \quad f_{u-1,v} \leq f_{u+1,v}, \right. \tag{2a}$$

$$\Delta u = \left\{ \frac{f_{u-1,v} - f_{u+1,v}}{2(f_{u-1,v} - f_{u,v})} \quad f_{u+1,v} \leq f_{u-1,v}. \right. \tag{2b}$$

Figure 6A:
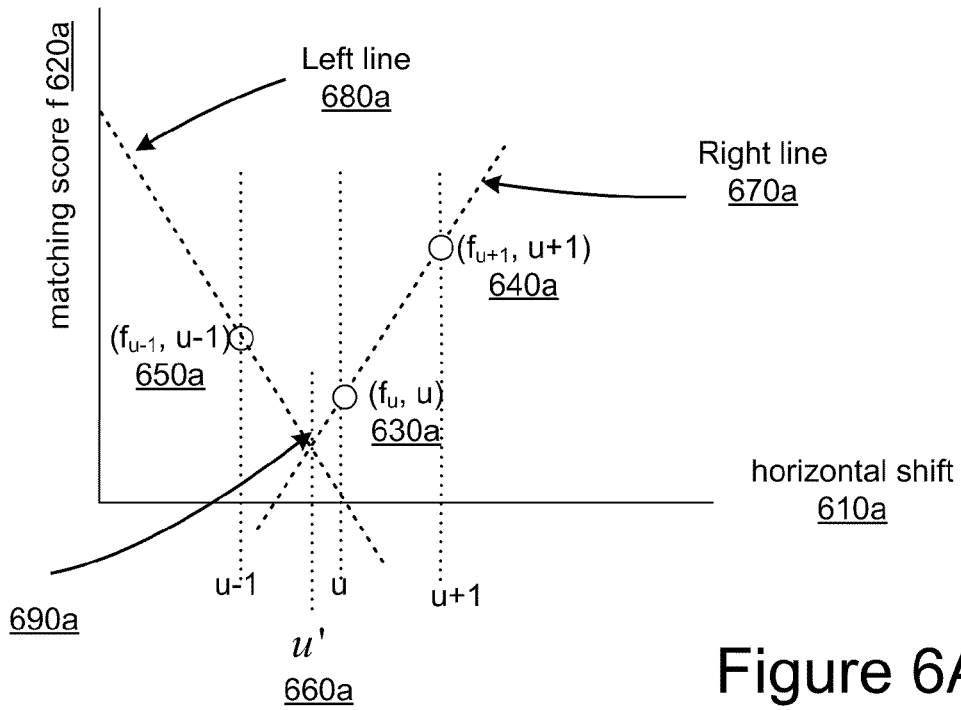
FIG. 6A is an illustration of sub-pixel optical flow estimation in a horizontal direction according to one embodiment of the invention.

FIG. 6A is an illustration of sub-pixel optical flow estimation in a horizontal direction. The horizontal movement of an optical flow is represented by a horizontal axis 610a and the matching scores are shown on a matching score axis 620a. In the example illustrated in FIG. 6A, the matching score of the left neighboring optical flow vector is smaller than the one of the right neighboring optical flow vector, i.e., $f_{u-1,v} \leq f_{u+1,v}$. The estimation module 146 has three samples, ($f_u$,u), ($f_{u-1}$, u−1), ($f_{u+1}$,u+1), of the underlying continuous function, and approximates the underlying continuous function by the right line 670a and the left line 680a containing the three samples. The right line 670a passes samples ($f_u$,u) and ($f_{u+1}$,u+1). The left line 680a passes the sample ($f_{u-1}$,u−1), and has the same slope as the right line 670a. Because $f_{u-1,v} \leq f_{u+1,v}$, the estimation module 146 estimates that the sub-pixel optical flow in horizontal direction is located in between the samples ($f_u$,u) and ($f_{u-1}$,u−1). The intersection 690a of the two lines 670a and 680a has a horizontal movement value u' 660a. Δu=u−u' and Δu represents the shift of the optical flow vector (u, v) at sub-pixel level in a horizontal direction.

Similarly, to calculate the vertical shift Δv, the estimation module 146 uses two of the four neighboring optical flow vectors, (u,v−1) and (u,v+1), of the optical flow vector (u, v) at the vertical direction. The estimation module 146 estimates the vertical shift using the following equation:

$$\Delta v = \left\{ \frac{f_{u,v-1} - f_{u,v+1}}{2(f_{u,v+1} - f_{u,v})} \quad f_{u,v-1} \leq f_{u,v+1}, \right. \tag{3a}$$

$$\Delta v = \left\{ \frac{f_{u,v-1} - f_{u,v+1}}{2(f_{u,v-1} - f_{u,v})} \quad f_{u,v+1} \leq f_{u,v-1}. \right. \tag{3b}$$

Figure 6B:
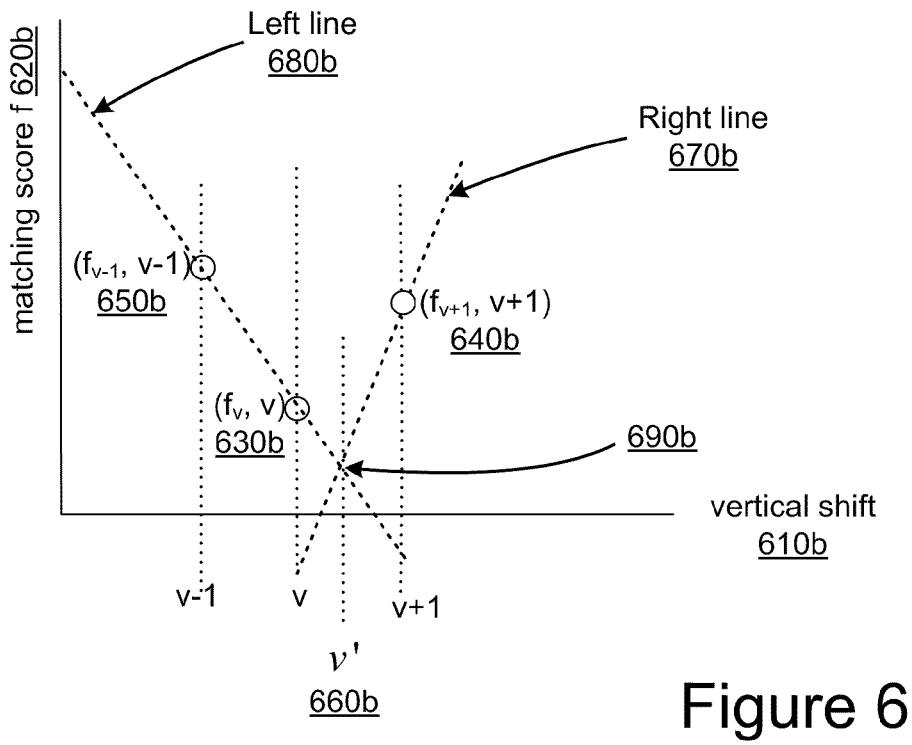
FIG. 6B an illustration of sub-pixel optical flow estimation in a vertical direction according to one embodiment of the invention.

FIG. 6B is an illustration of sub-pixel optical flow estimation in a vertical direction. The vertical movement of an optical flow is represented by 610b and the matching scores are shown on the matching score axis 620b. In the example illustrated in FIG. 6B, the matching score of the left neighboring optical flow vector is greater than the one of the right neighboring optical flow vector, i.e., $f_{u,v-1} \geq f_{u,v+1}$. The estimation module 146 has three samples, $(f_v,v)$, $(f_{v-1}, v-1)$, $(f_{v+1},v+1)$, of the underlying continuous function, and approximates the underlying continuous function by the right line 670b and the left line 680b containing the three samples. The left line 680b passes samples $(f_v,v)$ and $(f_{v-1},v-1)$. The right line 670b passes the sample $(f_{v+1},v+1)$, and has the same slope as the right line 680b. Because $f_{u,v-1} \geq f_{u,v+1}$. The estimation module 146 estimates that the sub-pixel optical flow in vertical direction is located in between the samples $(f_v,v)$ and $(f_{v+1},v+1)$. The intersection 690b of the two lines 670b and 680b has a vertical movement value v' 660b. Δv=v−v' and Δv represents the shift of the optical flow vector (u, v) at sub-pixel level in a vertical direction.

Figure 7:
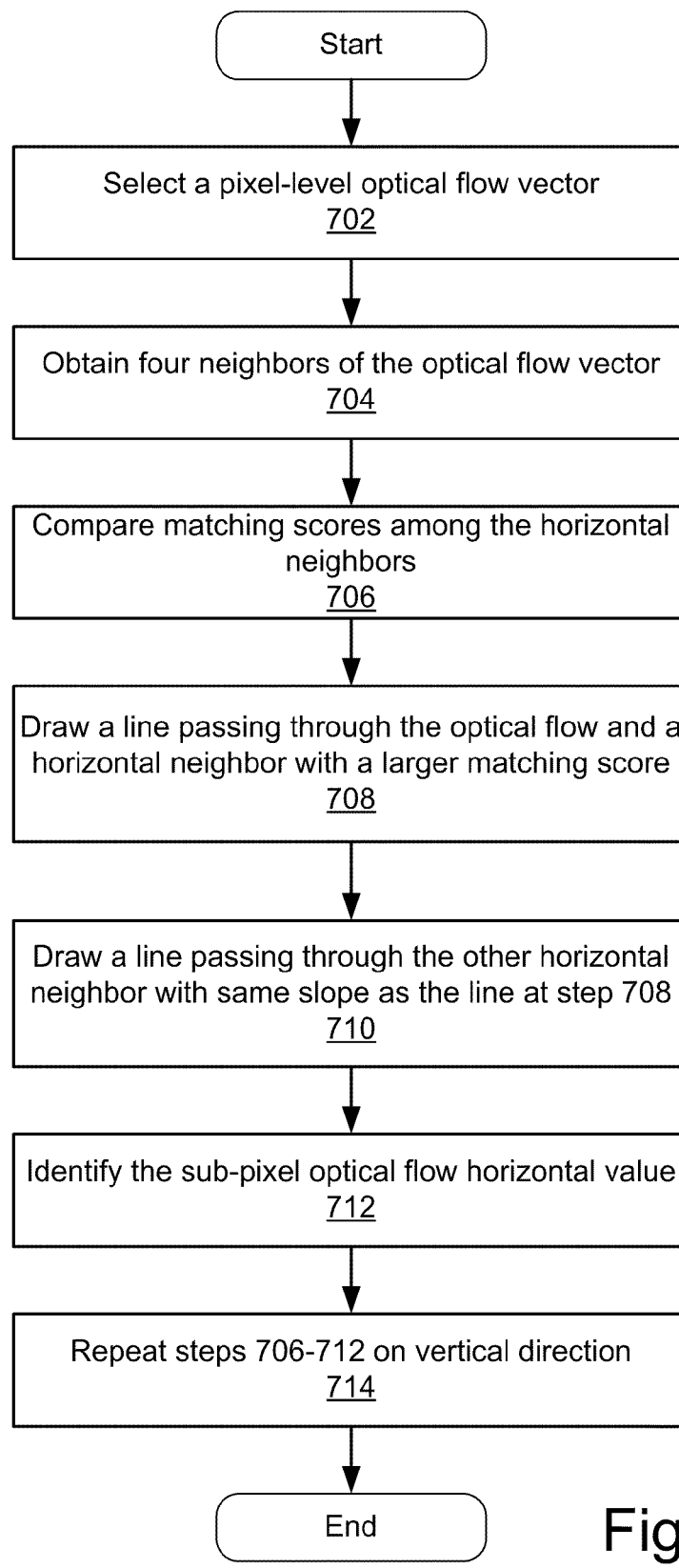
FIG. 7 is a flowchart of sub-pixel optical flow estimation method according to one embodiment of the invention.

FIG. 7 is a flowchart of sub-pixel optical flow estimation method according to one embodiment of the invention. Initially, the sub-pixel optical flow estimation module 146 selects 702 a pixel-level optical flow vector among multiple pixel-level optical flow vector candidates. In one embodiment, the estimation module 146 selects 702 the pixel-level flow vector based on the matching scores associated with each optical flow vector. The estimation module 146 obtains 704 four neighboring optical flow vectors of the selected pixel-level flow vector. Each of the optical flow vectors has a matching score associated with it. The pixel-level optical flow and its four neighboring optical flow vectors and their associated matching score are described in a coordinate system defined by matching score and horizontal/vertical optical flow shift. To estimate the horizontal shift of the optical flow at sub-pixel level, the estimation module 146 compares 706 the matching scores of the two horizontal neighboring optical flow vectors of the selected optical flow. The estimation module 146 draws 708 a first line passing through the selected optical flow and its horizontal neighbor with a larger matching score. The estimation module 146 draws 710 a second line passing through the other horizontal neighbor, where the second line has the same slope as the first line. The estimation module 146 identifies 712 the intersection of the first and second lines. The difference between the horizontal movement value of the selected pixel-level optical flow and the corresponding horizontal movement value of the intersection represents the amount of horizontal shift of the optical flow at sub-pixel level. The sub-pixel optical flow in the horizontal direction is the sum of the horizontal movement value of the selected pixel-level optical flow and the calculated horizontal shift.

To estimate the vertical shift of the optical flow at sub-pixel level, the estimation module 146 repeats 714 the steps of 706-712 above at vertical direction. Specifically, the estimation module compares the matching scores of the two vertical neighboring optical flow vectors of the selected pixel-level optical flow. The estimation module 146 draws a first line passing through the selected optical flow and its vertical neighbor with a larger matching score. The estimation module 146 draws a second line passing through the other vertical neighbor, where the second line has the same slope as the first line. The estimation module 146 identifies the intersection of the first and second lines. The difference between the vertical movement value of the selected pixel-level optical flow and the corresponding vertical movement value of the intersection represents the amount of vertical shift of the optical flow at sub-pixel level. The sub-pixel optical flow in the vertical direction is the sum of the vertical movement value of the selected pixel-level optical flow and the calculated vertical shift.

3D Sub-Pixel Level Optical Flow Estimation

To further enhance accuracy of sub-pixel optical flow estimation, embodiments of the invention provide fast and robust sub-pixel optical flows for pixels of an input image by approximating the sub-pixel optical flows in a 3D space. Computation cost for 3D sub-pixel optical flow estimation is still low compared to conventional image interpolation and parametric function fitting. In one embodiment, for a pixel $P^t$ (x, y) of image 310, the 3D sub-pixel optical flow estimation module 150 selects a pixel-level optical flow candidate associated with the pixel $P^t$ (x, y) and evaluates the selected pixel-level optical flow vector and its 4 neighboring pixel-level optical flow vectors in a 3D space. Based on the matching scores of the four neighboring optical flow vectors, the 3D sub-pixel optical flow estimation module 150 determines the sub-pixel optical flow vector for the pixel $P^t$ (x, y) of image 310.

Specifically, the 3D sub-pixel optical flow estimation module selects a pixel-level optical flow vector (u, v) of a pixel $P^t$ (x, y) of image 310 and its neighboring optical flow vectors and determines the sub-pixel optical flow for the pixel $P^t$(x, y) of image 310. The pixel-level optical flow vector (u, v) is selected by the estimation module 150 among all the pixel-level optical flow candidates associated with the pixel $P^t$ (x, y). The optical flow vector (u, v) has four neighboring optical flow vectors, (u−1,v), (u+1, v), (u,v+1), and (u,v−1). Each of the pixel-level optical flow vector (u, v) and its four neighboring optical flow vectors has a matching score associated with it, $f_{u,v}$, $f_{u-1,v}$, $f_{u+1,v}$, $f_{u,v+1}$, and $f_{u,v-1}$ respectively. Without loss of generality, it is assumed that (u, v)=(0,0), and $f_{u-1,v} < f_{u+1,v}$, $f_{u,v-1} < f_{u,v+1}$, and $f_{u,v}=0$.

A plane in the 3D space passing points (0,0,0), (−1,0,f(−1,0)), and (0,−1,f(0,−1)) is described in the following equation:

$$f(-1,0)x + f(0,-1)y + z = 0. \tag{4}$$

Similarly, a plane in the 3D space passing points (1,0,f(1,0)), (0,−1,f(0,−1)), and having the slope as the plane described by equation (4) above in x-axis is described in the following equation:

$$-f(-1,0)x + (f(0,-1) + f(-1,0) - f(1,0))y + z = f(1,0) - f(-1,0), \tag{5}$$

and a plane in the 3D space passing points (0,1,f(0,0), and (−1,0,f(−1,0)), and having the slope as the plane described by equation (4) above in y-axis is described in the following equation:

$$(f(-1,0) + f(0,-1) - f(0,1))x - f(0,-1)y + z = f(0,1) - f(0,-1). \tag{6}$$

and the intersection of the three planes of equations (4), (5) and (6) is given in the following equation:

$$\begin{cases} x = \dfrac{f_x\{f_y - 2f(0,-1)\}}{d} \\ y = \dfrac{f_y\{f_x - 2f(-1,0)\}}{d} \\ z = \dfrac{2f(-1,0)f(0,-1)(f_x + f_y) - f_x f_y \{f(-1,0) + f(0,-1)\}}{d} \end{cases} \quad (7)$$

where $d = 4f(-1,0)f(0,-1) - f_x f_y$, $f_x = f(1,0) - f(-1,0)$ and $f_y = f(0,1) - f(0,-1)$. The computed (x, y) by the 3D sub-pixel optical flow estimation module 150 represents the minimum sub-pixel optical flow movements in x-axis and y-axis, which corresponds to the ($\Delta u$, $\Delta v$) calculated by the two-dimensional sub-pixel optical flow estimation module 146. The (x, y) represents the sub-pixel optical flow for the pixel P'(x, y) of image 310.

Figure 8:
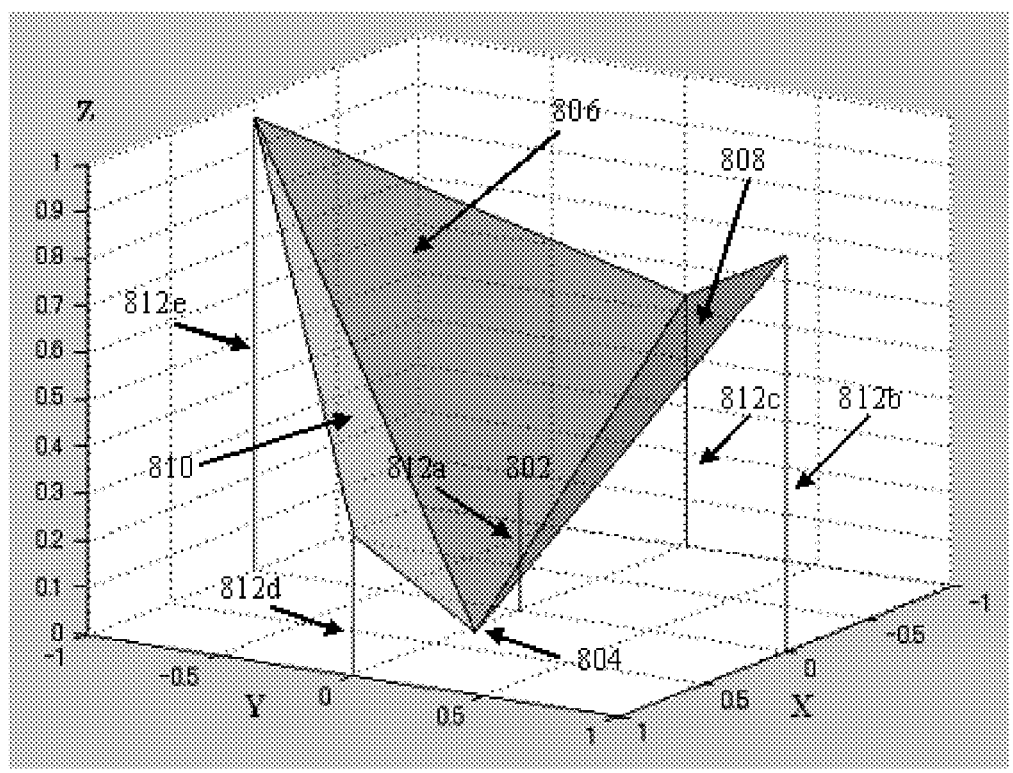
FIG. 8 is an illustration of sub-pixel optical flow estimation in a three-dimensional space according to one embodiment of the invention.

Referring now to FIG. 8, FIG. 8 is an illustration of 3D sub-pixel optical flow estimation of a selected pixel-level optical flow vector (u, v) of a pixel P'(x, y) of image 310. The optical flow vector (u, v) represents the pixel-level optical flow with minimum matching score for pixel P'(x, y) of image 310 estimated by the two-dimensional sub-pixel optical flow estimation module 146. The point corresponding to the pixel-level optical flow vector (u, v) in a 3D space is at (0,0, f(0,0)) 802. The plane 806 is described by equation (4), the 808 plane is described by equation (5) and the plane 810 is described by equation (6) above. The three planes 806, 808 and 810 are shifted up in z-axis because f(0,0) is assumed to be zero in the equations (4), (5) and (6), which is not shown in FIG. 8. The lines 812a-812e represent the matching scores $f_{u,v}$, $f_{u,v+1}$, $f_{u-1,v}$, $f_{u+1,v}$, and $f_{u,v-1}$ of the optical flow vector (u, v) and its four neighboring optical flow vectors, (u, v+1), (u−1, v), (u+1, v), and (u, v−1), respectively. The point 804 represents the intersection of the plane 806, plane 808 and plane 810 calculated by the equation (7) described above. The (x, y) value of the point 804 represents the sub-pixel optical flow of P'(x, y) of image 310 estimated by the 3D sub-pixel optical flow estimation module 150.

To provide fast and robust sub-pixel optical flows for pixels of an input image, a sub-pixel optical flow estimation system exploits pixel-level optical flows and corresponding matching scores to directly compute sub-pixel optical flows in a two-dimensional or a three-dimensional space. By using pixel-level optical flows and corresponding matching scores, the sub-pixel optical flow estimation system avoids complex and computationally expensive image interpolation and parametric functions to compute sub-pixel optical flows. Using a selected pixel-level optical flow and its four neighboring optical flows by the sub-pixel optical flow estimation system provides a suitable sub-pixel optical flow estimation solution in real-time. The disclosed sub-pixel optical flow estimation system has a wide range application to real world problems, such as applications in robotics and automotive systems.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer implemented method for estimating sub-pixel optical flow of a pixel of an input image, the method comprising:
   receiving the input image and a reference image of the input image, wherein the reference image is one of a subsequent image or a previous image of the input image;
   for each pixel of the input image:
      estimating a plurality of candidate pixel-level optical flows of the pixel using the reference image of the input image, wherein the pixel-level optical flow of the pixel represents relative movement of the pixel between the input image and the reference image;
      selecting a pixel-level optical flow from a plurality of candidate pixel-level optical flows of the pixel associated with the pixel;
      obtaining a plurality of neighboring pixel-level optical flow vectors of the selected pixel-level optical flow; and
      estimating the sub-pixel optical flow of the pixel based on the selected pixel-level optical flow and its neighboring pixel-level optical flow vectors by approximating an underlying continuous function for sub-pixel optical flow estimation, wherein approximating the underlying continuous function comprises:
         calculating a horizontal shift of the pixel-level optical flow using the selected pixel-level optical flow, its horizontal pixel-level optical flow vectors and associated matching scores; and
         calculating a vertical shift of the pixel-level optical flow using the selected pixel-level optical flow, its two vertical pixel-level optical flow vectors and associated matching scores;
      wherein the sub-pixel optical flow of the pixel in horizontal direction is sum of estimated pixel-level optical flow in horizontal direction and the calculated horizontal shift, and the sub-pixel optical flow of the pixel in vertical direction is sum of estimated pixel-level optical flow in vertical direction and the calculated vertical shift.

2. The method of claim 1, wherein estimating the plurality of candidate pixel-level optical flows of the pixel comprises:
   selecting a window of pixels having a first size from the input image and a search range, wherein the selected window of pixels is centered at the pixel being estimated;
   selecting a plurality of search windows of pixels from the reference image, wherein each search window is of said first size, and the search window is within the search range; and
   generating a matching score between the pixel values of the selected window of the input image and the pixel values of a search window of the plurality of the search windows from the reference image, wherein the relative movement between the pixel centered by the search window of the plurality of the search windows and the pixel of the input image being estimated represents a candidate pixel-level optical flow.

3. The method of claim 2, wherein the selected window of pixels from the input image has a predetermined size.

4. The method of claim 2, wherein a search window from the reference image is centered at a pixel having the same coordinates as the pixel being centered by the selected window from the input image.

5. The method of claim 2, further comprises selecting a starting search window of pixels and an ending search window of pixels from the reference image, wherein the starting search window and the ending search window have the same size as the selected window from the input image, the search range is defined by the pixel centered by the starting search window and the pixel centered by the ending search window from the reference image.

6. The method of claim 1, wherein estimating the plurality of candidate pixel-level optical flows of the pixel further comprises:
generating a matching score map for the pixel of the input image based on matching scores of the plurality of the search windows.

7. The method of claim 1, wherein selecting a pixel-level optical flow from the plurality of candidate pixel-level optical flows of the pixel associated with the pixel comprises selecting the pixel-level optical flow having the minimum matching score among the plurality of the candidate pixel-level optical flows.

8. The method of claim 1, wherein obtaining four neighboring pixel-level optical flow vectors of the selected pixel-level optical flow comprises:
selecting two neighboring pixel-level optical flow vectors the selected pixel-level optical flow in a first direction; and
selecting two neighboring pixel-level optical flow vectors the selected pixel-level optical flow in a second direction perpendicular to the first direction.

9. A computer system for estimating sub-pixel optical flow of a pixel of an input image, the system comprising:
a pixel-level optical flow estimation module configured to receive the input image and a reference image of the input image, wherein the reference image is one of a subsequent image or a previous image of the input image;
for each pixel of the input image:
the pixel-level optical flow estimation module further configured to estimate a plurality of candidate pixel-level optical flows of the pixel using the reference image of the input image, wherein the pixel-level optical flow of the pixel represents relative movement of the pixel between the input image and the reference image;
a sub-pixel optical flow estimation module configured to select a pixel-level optical flow from a plurality of candidate pixel-level optical flows of the pixel associated with the pixel;
the sub-pixel optical flow estimation module further configured to obtain a plurality of neighboring pixel-level optical flow vectors of the selected pixel-level optical flow; and
the sub-pixel optical flow estimation module further configured to estimate the sub-pixel optical flow of the pixel based on the selected pixel-level optical flow and its neighboring pixel-level optical flow vectors by approximating an underlying continuous function for sub-pixel optical flow estimation, wherein approximating the underlying continuous function comprises:
calculating a horizontal of the pixel-level optical flow using the selected pixel-level optical flow, its two horizontal pixel-level optical flow vectors and associated matching scores; and
calculating a vertical shift of the pixel-level optical flow using the selected pixel-level optical flow, its two vertical pixel-level optical flow vectors and associated matching scores;
wherein sub-pixel optical flow of the pixel in horizontal direction is sum of estimated pixel-level optical flow in horizontal direction and the calculated horizontal shift, and the sub-pixel optical flow in vertical direction and the calculated vertical shift.

10. The system of claim 9, wherein the pixel-level optical flow estimation module is further configured to:
select a window of pixels having a first size from the input image and a search range, wherein the selected window of pixels is centered at the pixel being estimated;
select a plurality of search windows of pixels from the reference image, wherein each search window is of said first size, and the search window is within the search range; and
generate a matching score between the pixel values of the selected window of the input image and the pixel values of a search window of the plurality of the search windows from the reference image, wherein the relative movement between the pixel centered by the search window of the plurality of the search windows and the pixel of the input image being estimated represents a candidate pixel-level optical flow.

11. The system of claim 10, wherein the pixel-level optical flow estimation module is further configured to:
select a starting search window of pixels and an ending search window of pixels from the reference image, wherein the starting search window and the ending search window have the same size as the selected window from the input image, the search range is defined by the pixel centered by the starting search window and the pixel centered by the ending search window from the reference image.

12. The system of claim 9, wherein the pixel-level optical flow estimation module is further configured to:
generating a matching score map for the pixel of the input image based on matching scores of the plurality of the search windows.

13. The system of claim 9, wherein the sub-pixel optical flow estimation module is configured to select the pixel-level optical flow having the minimum matching score among the plurality of the candidate pixel-level optical flows.

14. The system of claim 9, wherein the sub-pixel optical flow estimation module is further configured to:
select two neighboring pixel-level optical flow vectors the selected pixel-level optical flow in a first direction; and
select two neighboring pixel-level optical flow vectors the selected pixel-level optical flow in a second direction perpendicular to the first direction.

15. A computer implemented method for estimating sub-pixel optical flow of a pixel of an input image in a three-dimensional space, the method comprising:
receiving the input image and a reference image of the input image, wherein the reference image is one of a subsequent image or a previous image of the input image;
for each pixel of the input image:
estimating a plurality of candidate pixel-level optical flows of the pixel using the reference image of the input image, wherein the pixel-level optical flow of the pixel represents relative movement of the pixel between the input image and the reference image;
selecting a pixel-level optical flow from a plurality of candidate pixel-level optical flows of the pixel associated with the pixel and a plurality of neighboring pixel-level optical flow vectors of the selected pixel-level optical flow, describing the selected pixel-level optical flow and the plurality of the neighboring pixel-level optical flow vectors in the three-dimensional space, wherein the selected pixel-level optical flow is in a first plane of the three-dimensional space, and the plurality of neighboring pixel-level optical flow vectors are in a second and third plane of the three-dimensional space; and estimating the sub-pixel optical flow of the pixel based on the selected pixel-level optical flow and its neighboring pixel-level optical flow vectors in the three-dimensional space by approximating an underling continuous function in the three-dimensional space, wherein approximating the underlying continuous function comprises:

calculating a shift vector of the pixel-level optical flow using the selected pixel-level optical flow, its two horizontal pixel-level optical flow vectors, the matching scored of the horizontal pixel-level optical flow vectors, two vertical pixel-level flow vectors and the matching scored of the vertical pixel-level optical flow vectors.

16. The method of claim 15, wherein approximating the underlying continuous function in the three-dimensional space comprises:

calculate a shift vector of the pixel-level optical flow using the selected pixel-level optical flow, its two horizontal neighboring pixel-level optical flow vectors, the matching scores of the horizontal neighboring pixel-level optical flow vectors, two vertical neighboring pixel-level flow vectors and the matching scores of the vertical neighboring pixel-level optical flow vectors.

17. A computer system for estimating sub-pixel optical flow of a pixel of an input image in a three-dimensional space, the system comprising:

a pixel-level optical flow estimation module configured to receive the input image and a reference image of the input image, wherein the reference image is one of a subsequent image or a previous image of the input image;

for each pixel of the input image:

the pixel-level optical flow estimation module further configured to estimate a plurality of candidate pixel-level optical flows of the pixel using the reference image of the input image, wherein the pixel-level optical flow of the pixel represents relative movement of the pixel between the input image and the reference image;

a sub-pixel optical flow estimation module configured to select a pixel-level optical flow from a plurality of candidate pixel-level optical flows of the pixel associated with the pixel and a plurality of neighboring pixel-level optical flow vectors of the selected pixel-level optical flow;

a three-dimensional sub-pixel optical flow estimation module configured to describe the selected pixel-level optical flow and the plurality of the neighboring pixel-level optical flow vectors in the three-dimensional space, wherein the selected pixel-level optical flow is in a first plane of the three-dimensional space, and the plurality of neighboring pixel-level optical flow vectors are in a second and third plane of the three-dimensional space; and the three-dimensional sub-pixel optical flow estimation module further configured estimate the sub-pixel optical flow of the pixel based on the selected pixel-level optical flow and its neighboring pixel-level optical flow vectors in the three-dimensional space by approximating an underling continuous function in the three-dimensional space, wherein approximating the underlying continuous function comprises:

calculating a shift vector of the pixel-level optical flow using the selected pixel-level optical flow, its horizontal pixel-level optical flow vectors, the matching scores of the horizontal pixel-level optical flow vectors, the vertical pixel-level flow vectors and the matching scores of the vertical pixel-level optical flow vectors.

18. The system of claim 17, wherein the pixel-level optical flow estimation module is further configured to:

select a window of pixels having a first size from the input image and a search range, wherein the selected window of pixels is centered at the pixel being estimated;

select a plurality of search windows of pixels from the reference image, wherein each search window is of said first size, and the search window is within the search range; and generate a matching score between the pixel values of the selected window of the input image and the pixel values of a search window of the plurality of the search windows from the reference image, wherein the relative movement between the pixel centered by the search window of the plurality of the search windows and the pixel of the input image being estimated represents a candidate pixel-level optical flow.

19. The system of claim 18, wherein the pixel-level optical flow estimation module is further configured to:

select a starting search window of pixels and an ending search window of pixels from the reference image, wherein the starting search window and the ending search window have the same size as the selected window from the input image, the search range is defined by the pixel centered by the starting search window and the pixel centered by the ending search window from the reference image.

* * * * *

UNITED STATES PATENT AND TRADEMARK OFFICE
CERTIFICATE OF CORRECTION

PATENT NO. : 8,406,506 B2
APPLICATION NO. : 12/782045
DATED : March 26, 2013
INVENTOR(S) : Morimichi Nishigaki It is certified that error appears in the above-identified patent and that said Letters Patent is hereby corrected as shown below:

In the Claims:

Column 12, line 29, before "horizontal" insert --two--.
Column 13, line 60, after "horizontal" insert --shift--.
Column 14, line 1, after "wherein" insert --the--.
Column 14, line 4, after "optical flow" insert --of the pixel in vertical direction is sum of estimated pixel-level optical flow--.
Column 15, line 20, delete "scored" and insert --scores--.
Column 15, line 22, delete "scored" and insert --scores--.
Column 16, line 22, before "horizontal" insert --two--.
Column 16, line 24, after "flow vectors," delete "the" and insert --two--.

Signed and Sealed this
Twentieth Day of August, 2013

Teresa Stanek Rea
*Acting Director of the United States Patent and Trademark Office*